July 8, 1924.

H. MAYER

AUTOMOBILE LOCK

Filed Dec. 27, 1921    2 Sheets-Sheet 1

1,500,836

INVENTOR
HENRY MAYER,
by Ralph Kalish ATTORNEY.

July 8, 1924.

H. MAYER

AUTOMOBILE LOCK

Filed Dec. 27, 1921

INVENTOR
HENRY MAYER,
by Ralph Kalish ATTORNEY.

Patented July 8, 1924.

1,500,836

UNITED STATES PATENT OFFICE.

HENRY MAYER, OF ST. LOUIS, MISSOURI, ASSIGNOR OF ONE-HALF TO FREDERICK MAYER, OF ST. LOUIS, MISSOURI.

AUTOMOBILE LOCK.

Application filed December 27, 1921. Serial No. 524,961.

*To all whom it may concern:*

Be it known that I, HENRY MAYER, a citizen of the United States, residing at the city of St. Louis, State of Missouri, have invented a certain new and useful Improvement in Automobile Locks, of which the following is a specification, reference being had to the accompanying drawings, forming a part thereof.

This invention relates generally to automobiles and, more particularly, to a certain new and useful improvement in automobile locks, the principal object of my present invention being to provide relatively simple, conveniently actuable means for efficiently and positively preventing the unauthorized use or theft of the automobile.

With the above and other objects in view, my present invention resides in the provision of a key-controlled automobile locking device comprising co-operating clutch elements or members associated with substantially essential parts of the steering-gear or mechanism, in the provision of a locking device of the kind stated so connected with the electrical wiring of the automobile that when the locking device is in so-called "unlocked" condition, the ignition wiring of the car is also "unlocked" or broken, and in the novel features of form, construction, arrangement, and combination of parts hereinafter described and afterwards pointed out in the claims.

In the accompanying drawings—

Figure 1:
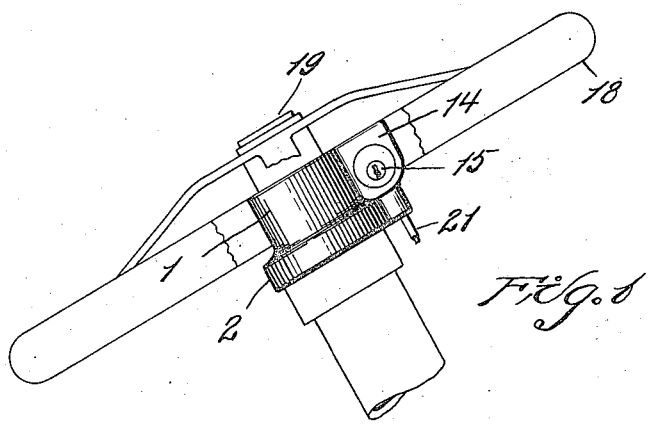
Figure 1 is an elevational view of an automobile steering-wheel and its post, the latter fragmentally shown, of the type comprising a reduction-gear between the wheel and post, equipped with a lock embodying my invention.
Figure 2:
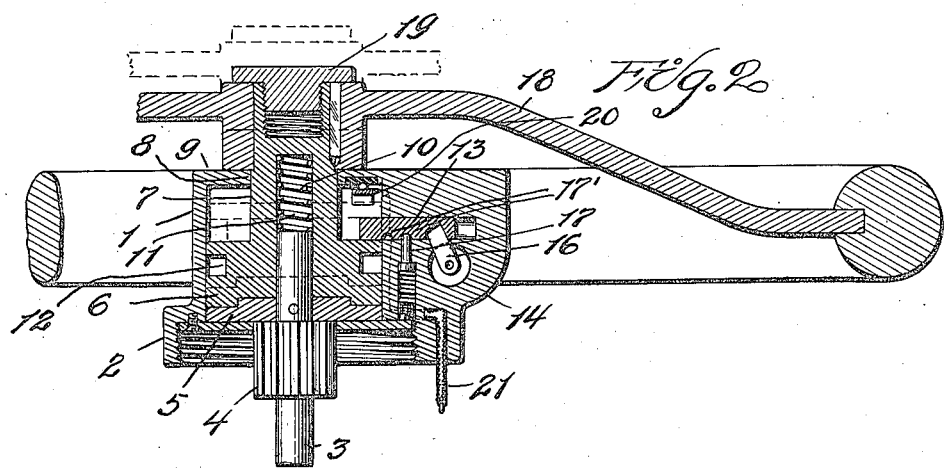
Figure 2 is an enlarged vertical sectional view of the wheel and its lock, with the lock in wheel-locking and ignition-circuit closing position.
Figure 3:
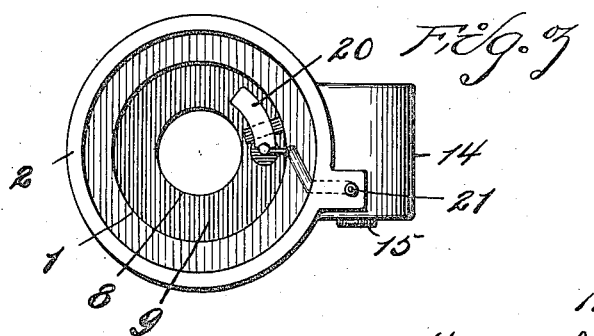
Figure 3 is an inverted plan view of the lock-housing or shell.

Referring now more in detail to said drawings, which illustrate practical embodiments of my invention and in which like reference-characters refer to like parts throughout the several views, 1 indicates a substantially inverted cup-shaped housing or shell having an annular internally threaded end-enlargement 2 adapted for threaded engagement with the fixed rigid steering-post (not shown) of an automobile, and with the usual steering-rod located within which post, as is standard, the stem 3 has, in the form of steering gear illustrated in Figures 1, 2 and 3, operative connection by means including the pinion or gear 4.

Disposed more or less snugly within shell 1 and pinned or otherwise fixed to stem 3 above gear 4, as best seen in Figure 2, is an annular plate or disk 5 forming one of the clutch-members of the lock, the plate 5 being formed on its upper surface with a series of suitably spaced substantially sector-shaped elevations or teeth.

Also disposed for both axial and rotary movement within shell 1 and for co-operation with clutch-member 5, is a second clutch-member 6 similarly formed upon its under face with a series of suitably spaced substantially sector-shaped teeth adapted for interlocking engagement with the teeth of lower clutch-member 5, the upper clutch-member 6 being formed preferably integrally with a shank 7 projecting for movement a suitable distance outwardly of shell 1 through an aperture, as at 8, provided for the purpose in the shell end-wall 9, and which shank 7 is formed longitudinally or axially with a bore 10 for accommodating both the projecting upper end-portion of steering-stem 3 and, for purposes shortly appearing, an interposed coiled expansion spring 11.

Formed also upon the upper clutch-member 6, is a circumferential groove 12 adapted, when the clutch-members 5 and 6 are in spaced or non-engaged relation, to accommodate the inner end-portion of a locking-bolt 13 arranged for sliding movement in a lateral enlargement or boss 14 formed upon shell 1, and disposed for rotary movement in shell-enlargement 14, is a key-actuated barrel 15 provided with an arm 16 having actuating engagement with bolt 13, as best seen in Figure 2. Disposed also in shell enlargement 14, is a yielding pin 17 adapted to project into a respective recess 17', 17', when the bolt 13 is either in clutch locking or unlocking position to releasably retain the bolt 13 against movement.

Feathered or otherwise fixed upon the outwardly or upwardly projecting end-portion of clutch-member shank 7, is a standard steering-wheel 18, and threaded into the upper-end of shank 7, as best seen in Figure 2, is a suitable wheel-retaining cap 19.

Disposed upon the inner face of shell end-wall 9, as seen in Figures 2 and 3, is a suitable preferably spring contact-member 20, electrically connected with which is one end of a suitable conductor 21 adapted for electrical connection at its other end with one side of the engine ignition circuit of the automobile.

Figure 4:
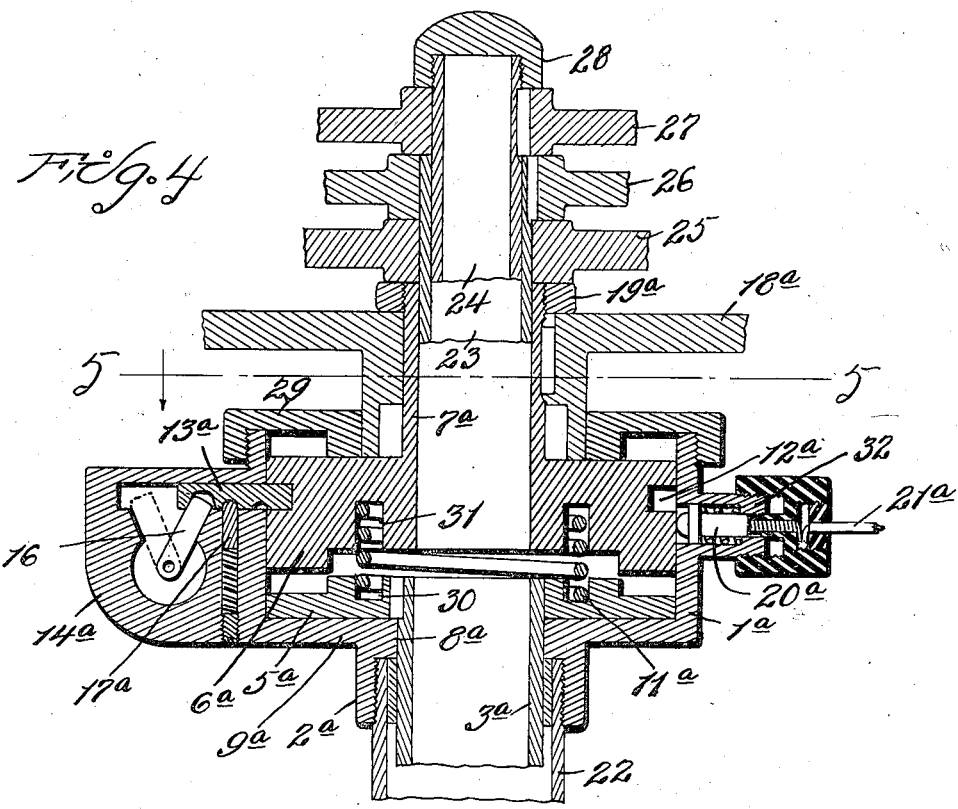
Figure 4 is a fragmental vertical sectional view of a modified form of steering-post and wheel equipped with a lock embodying my invention.
Figure 5:
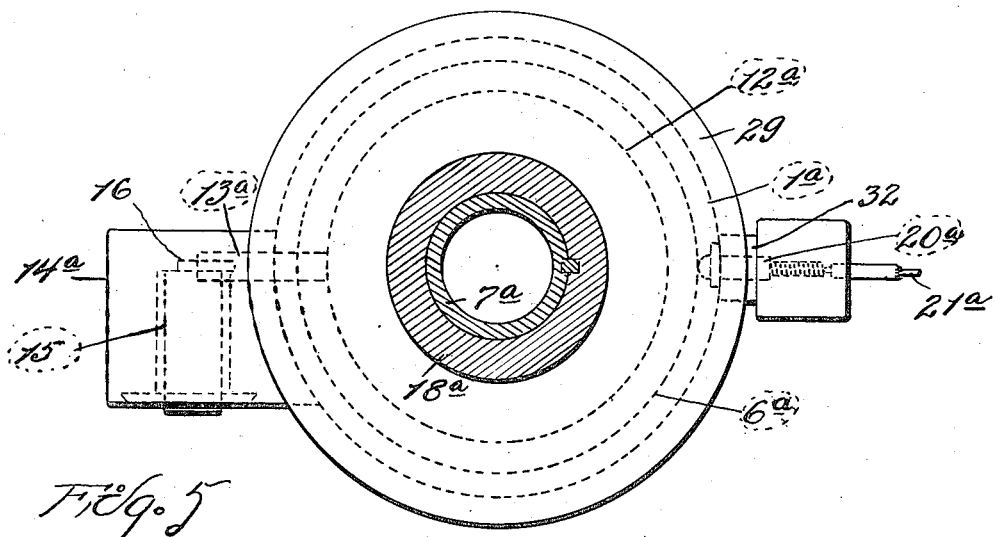
Figure 5 is a sectional plan view taken approximately on the line 5—5, Figure 4.

In the modified form of steering-mechanism illustrated in Figures 4 and 5, 1ª indicates the lock-housing or shell, which is also substantially cup-shaped, but, in this instance, has its open end presented upwardly, and which is provided upon the outer face of its end wall 9ª with an annular internally threaded extension 2ª adapted for threaded engagement with the fixed rigid steering post 22 of the automobile, the end wall 9ª of the shell 1ª being also apertured, as at 8ª for accommodating the upper end-portion of post 22, as shown.

Disposed lengthwise for rotary movement in the steering post 22, is a steering stem 3ª, and disposed more or less snugly within shell 1ª and feathered or otherwise fixed to stem 3ª, is the lower clutch-member 5ª.

Also disposed for both axial and rotary movement within the shell 1ª and for cooperation with lower clutch-member 5ª, is the upper clutch member 6ª likewise formed preferably integrally with a preferably tubular shank 7ª projecting a suitable distance outwardly of shell 1ª.

Feathered or otherwise fixed upon the outwardly or upwardly projecting end portion of clutch-member shank 7ª is the usual steering wheel 18ª, and threaded upon the upper end of shank 7ª, as best seen in Fig. 4, is a suitable wheel retaining-cap or nut 19ª.

Disposed for working movement within the stem 3ª are the usual "gas" and "spark" controlling-members or rods 23 and 24, respectively, and suitably located upon the members or rods 23 and 24 are the usual quadrant 25, gas controlling-lever 26, and spark controlling-lever 27. The several levers 26 and 27 are surmounted by the usual retaining member or cap 28, and the upper end of shell 1ª is suitably closed by a flanged cap 29 centrally apertured to accommodate preferably both clutch-member shank 7ª and the hub of steering-wheel 18ª, as shown.

The co-operating clutch members 5ª and 6ª are formed with communicating annular recesses 30—31, within which is seated, for purposes shortly appearing, a suitable coiled expansion spring 11ª; and formed also upon the upper clutch-member 6ª, is a circumferential groove 12ª adapted, when the clutch-members 5ª and 6ª are in spaced or non-engaged relation, to accomodate the inner end-portion of a locking-bolt 13ª arranged for sliding movement in a lateral enlargement or boss 14ª formed upon shell 1ª and key actuable in a manner similar to the key actuation of locking bolt 13, a yielding pin 17ª being similarly adapted for releasable engagement with the bolt 13ª to retain the same against movement.

Formed upon shell 1ª is a bored extension or casing 32, within which is disposed for movement a spring-pressed ball-pointed contact-member 20ª, electrically connected with which is one end of a suitable conductor 21ª adapted for electrical connection at its other end with one side of the engine ignition circuit of the automobile.

In use or operation, we will assume that the automobile is running and that the parts are in operative locked or so-called normal relation, as illustrated in full lines in Figure 2. When in such relation, the clutch-members 5 and 6, or 5ª and 6ª, as the case may be, are in interlocking engagement, spring 11 or 11ª being compressed and bolt 13 or 13ª being projected with its inner end-portion disposed engagingly above upper clutch-member 6 or 6ª in clutch-locking position. And with the parts in such described or normal condition, the upper clutch-member 6, in one form of the lock, is out of electrical engagement with contact-member 20, and, in the other form of lock here shown, the contact-member 20ª is adapted for idle disposition in the groove 12ª, the ignition circuit of the engine in both instances being closed and complete.

The automobile coming to a standstill and it being desired to prevent theft or unauthorized use of the automobile, the lock-barrel 15 is key actuated in the proper direction, whereupon bolt 13 or 13ª will be slidably actuated out of its described normal position above upper clutch member 6 or 6ª, and, under the tension of spring 11 or 11ª, upper clutch member 6 or 6ª will be then yieldingly axially moved out of clutch engagement with lower clutch member 5 or 5ª, or into the position thereof illustrated in dotted lines in Figure 2 and in full lines in Figure 4, when, as will be evident, any movement of steering wheel 18 or 18ª will be without effect upon the stem 3 or 3ª and its connected parts. At the same time, in one form of the lock, the clutch member 6 will engage electrically with contact-member 20 and short circuit or ground and thereby break the ignition circuit of the engine; or, in the other form of the lock here shown, the contact member 20ᵃ will engage electrically with the upper clutch member 6ᵃ, as seen in Figure 4, and similarly short circuit or ground and thereby break the ignition circuit of the engine. On lock-barrel 15 being now reversely key actuated, locking bolt 13 or 13ᵃ will be projected at its inner end into the clutch groove 12 or 12ᵃ and thereby positively and efficiently lock the clutch members 5 and 6 or 5ᵃ and 6ᵃ out of clutching or interlocking engagement and, at the same time, maintain or "lock" the ignition circuit of the engine in broken condition.

Authorized use of the automobile being later desired, the lock bolt 13 or 13ᵃ is first, by suitable operation of key actuated barrel 15, actuated to carry its inner end out of the clutch groove 12 or 12ᵃ, when, under suitable pressure applied upon cap 19 or cap 28, as the case may be, the parts of the lock above the lower clutch member 5 or 5ᵃ may be depressed to again throw the lower clutch member 6 or 6ᵃ into locking engagement with the lower clutch member 5 or 5ᵃ, when locking bolt 13 or 13ᵃ is again projected forwardly into clutch locking position above upper clutch member 6 or 6ᵃ or into the position thereof illustrated in Figure 2, the ignition circuit of the engine being at the same time closed and completed, in the one instance, by the removal of upper clutch member 6 from electrical engagement with contact member 20 and, in the other instance, by contact member 20ᵃ moving into clutch groove 12ᵃ.

I am aware that minor changes in the form, construction, arrangement, and combination of the several parts of my new lock may be made and substituted for those herein shown and described without departing from the nature and principle of my invention.

Having thus described my invention, what I claim and desire to secure by Letters Patent is:

1. The combination with the steering-post, steering-stem, steering wheel, and ignition circuit of an automobile, of a shell disposed upon the steering post and having electrical connection with the ignition circuit, and means including a clutch-member disposed for movement within the shell for locking the steering wheel in and out of steering engagement with the stem and for breaking and closing the ignition circuit, said clutch-member being adapted to metallically contact with the shell and thereby short the ignition circuit when in wheel unlocking position.

2. The combination with the steering-post, steering stem, steering wheel, and ignition circuit of an automobile, of a shell disposed upon the steering-post, a contact upon the shell having electrical connection with the ignition circuit, and means including a clutch-member disposed for movement within the shell for locking the steering-wheel in and out of steering engagement with the stem and for breaking and closing the ignition circuit, said clutch-member being adapted to electrically engage with the contact-member and thereby short the ignition circuit when in wheel unlocking position.

In testimony whereof, I have signed my name to this specification.

HENRY MAYER.